US012724213B2

(12) United States Patent
Kurokawa et al.

(10) Patent No.: US 12,724,213 B2
(45) Date of Patent: Sep. 1, 2026

(54) OPTICAL MODULE

(71) Applicant: SUMITOMO ELECTRIC INDUSTRIES, LTD., Osaka (JP)

(72) Inventors: Munetaka Kurokawa, Osaka (JP); Hiroshi Hara, Osaka (JP); Masato Furukawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 305 days.

(21) Appl. No.: 18/449,746

(22) Filed: Aug. 15, 2023

(65) Prior Publication Data

US 2024/0069293 A1 Feb. 29, 2024

(30) Foreign Application Priority Data

Aug. 23, 2022 (JP) ................................ 2022-132464

(51) Int. Cl.
*H04B 10/00* (2013.01)
*G02B 6/42* (2006.01)

(52) U.S. Cl.
CPC ......... *G02B 6/4256* (2013.01); *G02B 6/4237* (2013.01); *G02B 6/4207* (2013.01); *G02B 6/4266* (2013.01)

(58) Field of Classification Search
CPC .. G02B 6/4256; G02B 6/4237; G02B 6/4207; G02B 6/4266; G02B 6/4213; G02B 6/4271; G02B 6/4251; G02B 6/42; G02B 6/3849; G02B 6/4201
See application file for complete search history.

(56) References Cited

U.S. PATENT DOCUMENTS

| | | | | |
|---|---|---|---|---|
| 4,752,109 A * | 6/1988 | Gordon ................ | G02B 6/4248 | 385/94 |
| 5,845,031 A * | 12/1998 | Aoki .................... | G02B 6/4204 | 385/92 |
| 9,291,784 B2 * | 3/2016 | Moriya ................ | G02B 6/3584 | |
| 10,673,026 B2 * | 6/2020 | Ullmann ............. | H01M 50/103 | |
| 2004/0131318 A1 * | 7/2004 | Mori .................... | G02B 6/4265 | 385/94 |
| 2009/0214207 A1 * | 8/2009 | Duricic ............... | H04J 14/0212 | 398/50 |
| 2010/0258538 A1 * | 10/2010 | Suzuki ................... | B23K 26/02 | 219/121.14 |
| 2011/0204215 A1 * | 8/2011 | Yoshida ............... | G02B 6/4226 | 359/507 |
| 2012/0128300 A1 * | 5/2012 | Ban ........................ | G02B 6/421 | 385/33 |

(Continued)

FOREIGN PATENT DOCUMENTS

| | | |
|---|---|---|
| JP | H07-084158 A | 3/1995 |
| JP | 2006-332599 A | 12/2006 |

*Primary Examiner* — Agustin Bello
(74) *Attorney, Agent, or Firm* — McDonald Hopkins LLC

(57) ABSTRACT

An optical module according to one embodiment includes a package having an opening surrounded by side walls, and a lid mounted on the package to seal the opening. The lid has a plate-like shape and includes a welded portion fixed by welding to an upper surface of the side wall of the package having the opening formed thereon, an easily deformable portion formed at a position separated from the welded portion and deformed along with the welding, and a central portion having a flat shape.

10 Claims, 11 Drawing Sheets

(56) References Cited

U.S. PATENT DOCUMENTS

| | | | | |
|---|---|---|---|---|
| 2014/0254983 | A1* | 9/2014 | Moriya | G02B 6/4251<br>228/175 |
| 2014/0370370 | A1* | 12/2014 | Kawase | H01M 50/15<br>219/121.64 |
| 2015/0260921 | A1* | 9/2015 | Moidu | G02B 6/3582<br>385/16 |
| 2019/0363510 | A1* | 11/2019 | Ariga | H01S 5/06817 |
| 2021/0120701 | A1* | 4/2021 | Chen | G02B 6/4269 |
| 2023/0367143 | A1* | 11/2023 | Kato | G02F 1/011 |
| 2024/0069293 | A1* | 2/2024 | Kurokawa | G02B 6/4256 |
| 2024/0372315 | A1* | 11/2024 | Takiguchi | H01S 5/023 |

* cited by examiner 5g
5k
5h
5j
5
5h
5g 1
2
5p(5q2)
65
D1
D2
D3
37
33
31
36
2d
34
21
12
11
88
3
4
5p(5q1)

OPTICAL MODULE

CROSS-REFERENCE TO RELATED APPLICATION

This application claims priority from Japanese Patent Application No. 2022-132464, filed on Aug. 23, 2022, the entire subject matter of which is incorporated herein by reference.

TECHNICAL FIELD

The present disclosure relates to optical modules.

BACKGROUND

Japanese Unexamined Patent Publication No. H7-84158 describes a waveguide optical module. The waveguide optical module includes a package and a lid. The package houses a light emitting element, a lens, a waveguide substrate, and a single mode optical fiber. The lid hermetically seals the package by means such as welding. A notch is provided in an upper portion of a side surface of the package. In the waveguide optical module described above, bending stress generated on the side surface of the package due to a temperature change when the lid is attached to the package is concentrated on the notch. Accordingly, influence on optical portions such as light emitting elements is intended to be prevented.

In the above-mentioned waveguide optical module, there is a concern that cracks may occur when stress is concentrated on the notch. Moreover, when the lid is fixed to the package by welding as described above, there is a possibility that the lid may be contracted due to the heat generated during the welding, and the package may be deformed due to the contraction. When the optical system is completed inside the package, the position of the components of the optical module may shift due to the deformation of the package, and thus, there is a possibility that a light coupling efficiency may vary.

SUMMARY

The present disclosure is to provide an optical module capable of suppressing deformation of a package.

An optical module according to the present disclosure includes a package having an opening and a lid mounted on the package to seal the opening. The lid has a welded portion fixed by welding to an upper surface of the package having the opening formed thereon and an easily deformable portion formed at a position separated from the welded portion and deformed by welding.

According to the present disclosure, deformation of a package can be suppressed.

DETAILED DESCRIPTION

Description of Embodiment of Present Disclosure

Figure 1:
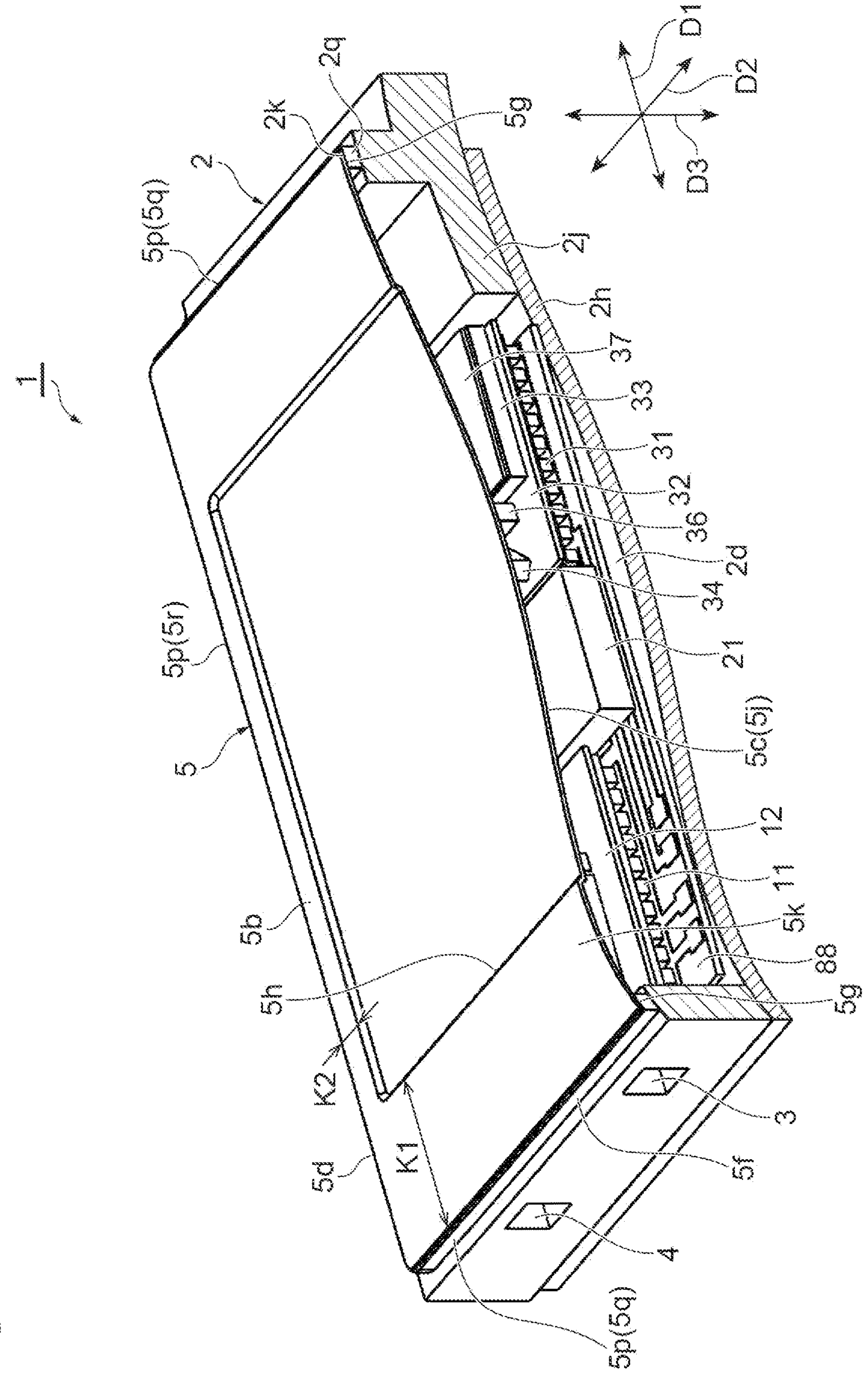
FIG. 1 is a partial cross-sectional view of an optical module according to a first embodiment.

First, contents of embodiments of an optical module according to the present disclosure will be listed and described. (1) An optical module according to an embodiment includes a package having an opening surrounded by side walls and a lid mounted on the package to seal the opening. The lid has a plate-like shape and includes a welded portion fixed by welding to an upper surface of the side wall of the package having the opening formed thereon, an easily deformable portion formed at a position separated from the welded portion and deformed along with the welding, and a central portion having a flat shape.

In this optical module, the opening of the package is sealed with the lid. The lid has the welded portion fixed by welding to the upper surface of the package with the opening formed thereon and the easily deformable portion deformed by the welding. The easily deformable portion is formed at a position separated from the welded portion. Therefore, by deforming the easily deformable portion separated from the welded portion to the package as a result of the welding, the deformation of the package can be suppressed. That is, since the stress applied to the package according to the welding can be decreased by the deformation of the easily deformable portion, the deformation of the package is suppressed. Therefore, even when the optical system is completed inside the package, it is possible to suppress the deviation in the positions of the optical components due to the deformation of the package, so that the light coupling efficiency can be stabilized.

(2) In (1) above, the lid may have a plate shape, and the easily deformable portion may be a step difference portion forming a convex shape or a concave shape with respect to the welded portion in a plate thickness direction of the lid. In this case, since the easily deformable portion can be formed as a step difference portion, the easily deformable portion can be easily formed.

(3) In (1) or (2) above, the lid may have a plate shape, and a thickness of the easily deformable portion of the lid may be smaller than a thickness of the welded portion. In this case, since the easily deformable portion can be allowed to be easier to deform, the deformation of the package can be suppressed more reliably.

(4) In any one of (1) to (3) above, the lid may have a rectangular shape having a pair of short sides and a pair of long sides as edge sides, and a distance from the short sides in the longitudinal direction of the lid to the easily deformable portion may be longer than a distance from the long sides of the lid in the transverse direction to the easily deformable portion. In the case where the length from the edge side of the lid to the easily deformable portion is long, the easily deformable portion can be more easily deformed than the case where the length from the edge side of the lid to the easily deformable portion is short. Therefore, in the case where the distance from the short side of the lid in the longitudinal direction to the easily deformable portion is longer than the distance from the long side of the lid in the transverse direction to the easily deformable portion, the easily deformable portions aligned along the longitudinal direction of the lid are allowed to be easily deformed, so that the deformation in the longitudinal direction of the package can be suppressed more reliably. Therefore, since the deformation in the longitudinal direction of the package can be suppressed more reliably than that in the transverse direction of the package, so that the light coupling efficiency can be further stabilized.

(5) In any one of (1) to (4) above, the lid may have an edge side, and the package may have a cavity located below the lid. The distance from the edge side of the portion of the lid facing the cavity to the easily deformable portion may be longer than the distance from the edge side of the portion of the lid not facing the cavity to the easily deformable portion. In this case, the easily deformable portion in the portion of the lid facing the cavity can be allowed to be easier to deform than the easily deformable portion in the portion of the lid not facing the cavity.

(6) In any one of (1) to (5) above, a convex frame may be provided on the upper surface of the side wall of the package.

Details of Embodiment of Present Disclosure

A specific example of an optical module according to an embodiment of the present disclosure will be described below with reference to the drawings. It is noted that the present invention is not limited to the following examples, but is intended to include all modifications indicated in the scope of the claims and within the scope of equivalents to the scope of the claims. In the description of the drawings, the same or corresponding elements are denoted by the same reference numerals, and overlapping descriptions are omitted as appropriate. In addition, the drawings may be partially simplified or exaggerated for easy understanding, and the dimensional ratios and the like are not limited to those described in the drawings.

Figure 2:
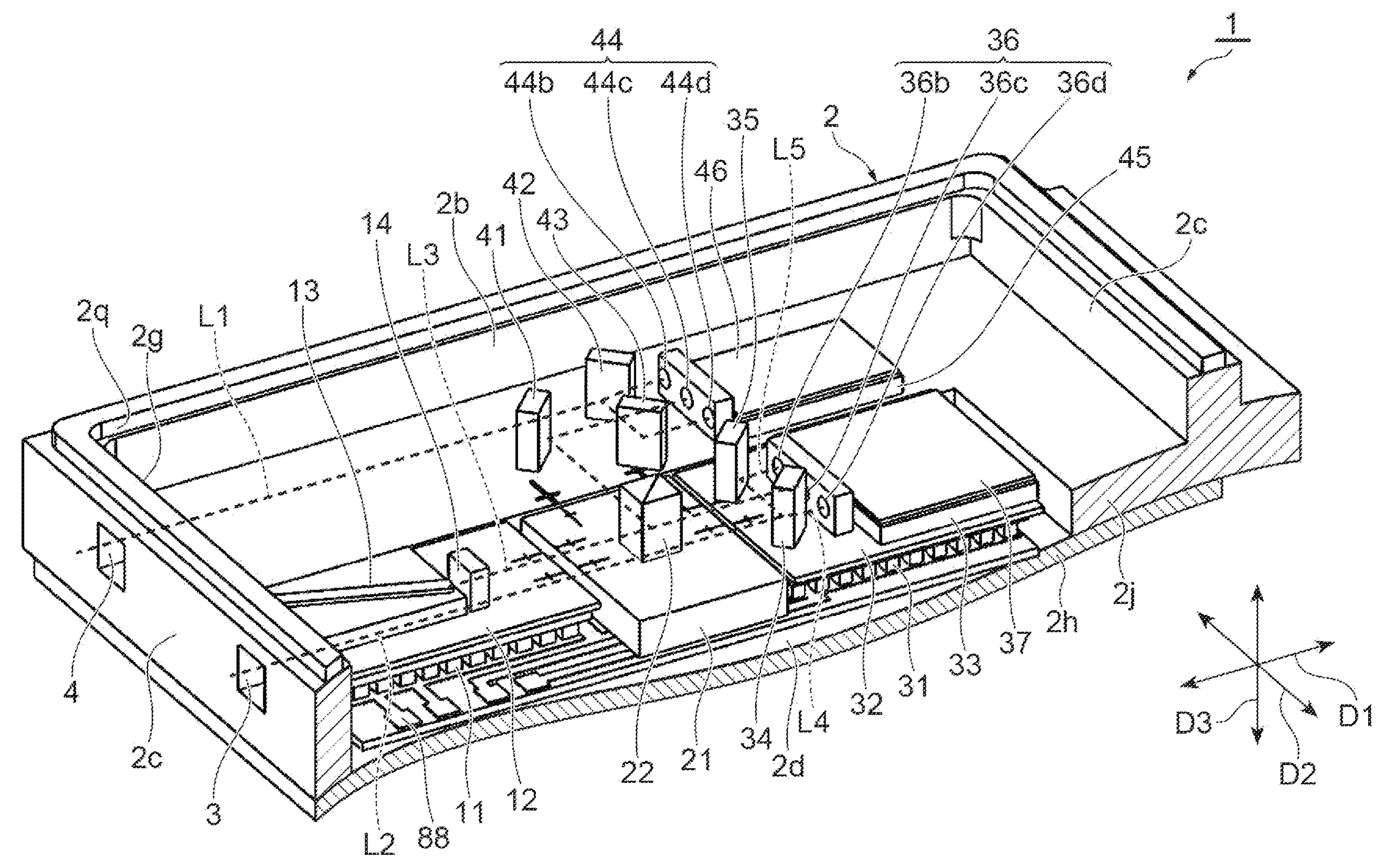
FIG. 2 is a partial cross-sectional view illustrating a state in which a lid is removed from the optical module of FIG. 1.

FIG. 1 is a partial cross-sectional view illustrating an optical module 1 as an example. FIG. 2 is a partial cross-sectional view illustrating an internal structure of the optical module 1. As illustrated in FIGS. 1 and 2, the optical module 1 includes a rectangular parallelepiped package 2 and a transmitting-side window 3 and a receiving-side window 4 formed in the package 2. Each of the transmitting-side window 3 and the receiving-side window 4 has the rectangular shape. The package 2 is made of, for example, ceramic. The package 2 includes a first side wall 2*b* extending along a first direction D1, a pair of second side walls 2*c* extending along a second direction D2 intersecting with the first direction D1, and a bottom wall 2*d* with components of the optical module 1 mounted thereon. The first direction D1 is a longitudinal direction of the optical module 1, and the second direction D2 is a width direction of the optical module 1.

The first side wall 2*b* extends in both the first direction D1 and a third direction D3. The third direction D3 is a direction intersecting with both the first direction D1 and the second direction D2 and corresponds to a height direction of the optical module 1. The pair of second side walls 2*c* are aligned along the first direction D1, and each second side wall 2*c* extends in both the second direction D2 and the third direction D3. The bottom wall 2*d* extends in both the first direction D1 and the second direction D2 at one end of the first side wall 2*b* and the second side wall 2*c* in the third direction D3. The pair of first side walls 2*b* and the pair of second side walls 2*c* form an opening 2*g* of the package 2 having a frame shape when viewed from the third direction D3. That is, the package 2 has the opening 2*g* surrounded by side walls (the pair of first side walls 2*b* and the pair of second side walls 2*c*).

The transmitting-side window 3 and the receiving-side window 4 pass through one of the pair of second side walls 2*c* in the first direction D1. The transmitting-side window 3 and the receiving-side window 4 are aligned along the second direction D2. The receiving-side window 4 is a portion for inputting input light L1 from the outside of the optical module 1 into the inside of the optical module 1. The transmitting-side window 3 is a portion for outputting output light L2 from the inside of the optical module 1 to the outside of the optical module 1.

The optical module 1 includes a first temperature control device 11 mounted on the bottom wall 2*d*, a variable wavelength light source base 12 mounted on the first temperature control device 11, a variable wavelength light source element 13 mounted on the variable wavelength light source base 12, and a lens 14. For example, the variable wavelength light source base 12 is made of either aluminum nitride or alumina. The variable wavelength light source element 13 is made of, for example, indium phosphide (InP). The lens 14 is made of glass or silicon (Si). The variable wavelength light source element 13 outputs light L3 to the lens 14, and the lens 14 outputs the light L3 to the side opposite to the transmitting-side window 3.

The optical module 1 has an intermediate substrate 21 mounted on a lower substrate 88 common to the first temperature control device 11 and a second temperature control device 31 and a beam splitter 22 mounted on the intermediate substrate 21. The intermediate substrate 21 is made of, for example, either aluminum nitride or alumina. The beam splitter 22 includes, for example, glass and dielectric multilayers. The beam splitter 22 receives the light L3 emitted from the lens 14 in the first direction D1. The beam splitter 22 transmits a portion of the light L3 in the first direction D1 and reflects the rest of the light L3 in the second direction D2.

The optical module 1 includes a second temperature control device 31 mounted on the bottom wall 2*d*, a modulation element base 32 mounted on the second temperature control device 31, a modulation element carrier 33 mounted on the modulation element base 32, a polarization multiplexing filter 34, a mirror 35, a lens 36, and a modulation element 37 mounted on the modulation element carrier 33. Each of the modulation element base 32 and the modulation element carrier 33 is made of, for example, either aluminum nitride or alumina.

The polarization multiplexing filter 34 is configured with glass and the dielectric multilayer film. The polarization multiplexing filter 34 receives light L4 output from the modulation element 37 via the lens 36. The polarization multiplexing filter 34 transmits the light L4 in the first direction D1 and outputs the light L4 to the transmitting-side window 3. The mirror 35 reflects light L5, which is output in the first direction D1 from the modulation element 37 via the lens 36, toward the polarization multiplexing filter 34 in the second direction D2. The polarization multiplexing filter 34 reflects the light L5 in the first direction D1 and outputs the output light L2, which is light obtained by multiplexing the light L4 and the light L5, to the transmitting-side window 3.

The lens 36 is made of, for example, either glass or silicon (Si). The lens 36 has a first lens portion 36*b*, a second lens portion 36*c*, and a third lens portion 36*d*. The first lens portion 36*b*, the second lens portion 36*c*, and the third lens portion 36*d* are aligned in this order along the second direction D2. The light L5 emitted from the modulation element 37 in the first direction D1 is input to the first lens portion 36*b*. The first lens portion 36*b* transmits the light L5 toward the mirror 35. The light L4 emitted from the modulation element 37 in the first direction D1 is input to the third lens portion 36*d*. The light L3 transmitted through the beam splitter 22 is input to the second lens portion 36*c*. The second lens portion 36*c* inputs the light L3 to the modulation element 37.

The modulation element 37 is made of, for example, either indium phosphide (InP) or silicon (Si). As an example, the modulation element 37 includes indium phosphide (InP), silicon dioxide ($SiO_2$), and benzocyclobutene (BCB). The modulation element 37 is, for example, a multimode interferometer having a plurality of optical waveguides. The modulation element 37 splits the input light L3, applies phase modulation, multiplexes a portion of the split light to emit the light L4, and multiplexes the rest of the split light to emit the rest of the split light as the light L5.

The bottom wall 2*d* of the package 2 includes a thin portion 2*h* on which the first temperature control device 11 and the second temperature control device 31 are mounted and a thick portion 2*j* having a thickness in the third direction D3 larger than the thin portion 2*h*. The optical module 1 includes a first mirror 41, a polarization separating filter 42, a second mirror 43, a lens 44, and a receiving element carrier 45 mounted on the thick portion 2*j*. Furthermore, the optical module 1 includes a receiving element 46 mounted on the receiving element carrier 45.

The first mirror 41 reflects the light L3 reflected by the beam splitter 22 in the second direction D2 in the first direction D1. The polarization separating filter 42 has, for example, glass and the dielectric multilayer film. The polarization separating filter 42 receives the input light L1 emitted from the receiving-side window 4 in the first direction D1. The polarization separating filter 42 transmits a portion of the input light L1 in the first direction D1 and reflects the rest of the input light L1 in the second direction D2. The second mirror 43 receives the input light L1 reflected in the second direction D2 from the polarization separating filter 42 and reflects the input light L1 in the first direction D1.

The lens 44 has a first lens portion 44*b*, a second lens portion 44*c*, and a third lens portion 44*d*. The first lens portion 44*b*, the second lens portion 44*c*, and the third lens portion 44*d* are aligned in this order along the second direction D2. The receiving element carrier 45 is made of either aluminum nitride or alumina. The receiving element 46 is made of either indium phosphide (InP) or silicon (Si). The input light L1 transmitted through the polarization separating filter 42 is input to the first lens portion 44*b*, and the input light L1 is input to the receiving element 46 by the first lens portion 44*b*. The light L3 reflected by the first mirror 41 is input to the second lens portion 44*c*. The input light L1 reflected by the second mirror 43 is input to the third lens portion 44*d*.

The optical module 1 has a lid 5 that seals the package 2. The lid 5 is made of, for example, metal. As an example, the lid 5 is made of Kovar. In addition, the lid 5 may be made of an alloy of iron and nickel (invar). The lid 5 has a rectangular shape. The lid 5 has, for example, a flat plate shape. The lid 5 includes an upper surface 5*b* extending in both the first direction D1 and the second direction D2, a lower surface 5*c* facing the side opposite to the upper surface 5*b*, a first side surface 5*d* extending in the first direction D1 and the third direction D3, and a second side surface 5*f* extending in the second direction D2 and the third direction D3.

The lid 5 hermetically seals the opening 2*g* of the package 2. For example, in the package 2, a metal frame 2*q* is bonded to the opening 2*g*, and the lid 5 is bonded to the package 2 via the frame 2*q*. The frame 2*q* is a convex frame provided on the upper surface of the side wall of the package 2. For example, the bonding of the lid 5 to the package 2 is performed by seam welding. In the seam welding, a voltage is applied between the lid 5 and the metal frame 2*q* of the package 2 to flow a current, and a contact interface between the lid 5 and the frame 2*q* is heated by Joule heat due to contact resistance. The heat generated by this heating melts Ni plating or Ni/Au plating applied to the lid 5 and the frame 2*q*, and thus, Au brazing material is formed, so that the lid 5 is bonded to the package 2.

In the above-described heating, the temperature of the entire lid 5 rises, and thereafter, residual stress may occur in the lid 5 due to thermal contraction of the lid 5. When the residual stress occurs in the lid 5, the package 2 may be deformed and distorted due to the thermal contraction of the lid 5, and thus, the package 2 may be in a warped state. A decrease in light coupling efficiency of the optical components arranged inside the package 2 may occur by the influence of the deformation (distortion) of the package 2. In addition, in this embodiment, there may arise a problem that an internal optical system of the optical module 1 cannot be adjusted after the package 2 is hermetically sealed. When the light coupling efficiency is decreased, there is a possibility that, for example, the output power of the output light L2 may be decreased.

Figure 3:
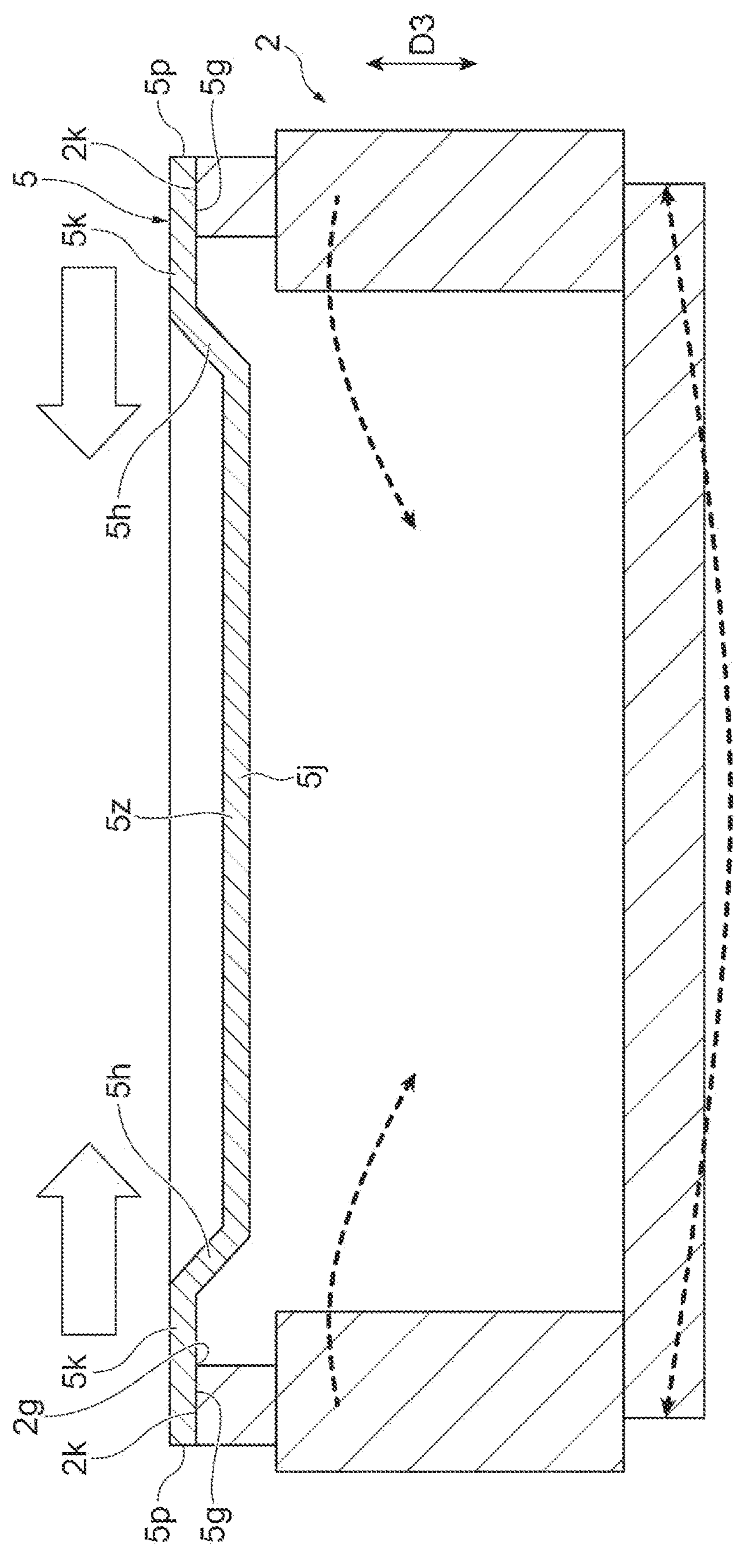
FIG. 3 is a cross-sectional view schematically illustrating a package and the lid of the optical module in FIG. 1.

FIG. 3 is a cross-sectional view schematically illustrating the package 2 and the lid 5. As illustrated in FIGS. 1 and 3, the lid 5 has a welded portion 5*g* fixed by welding to an upper surface 2*k* of the side wall of the package 2 with the opening 2*g* formed thereon, an easily deformable portion 5*h* formed at a position separated from the welded portion 5*g*, and a flat central portion 5*z*. The easily deformable portion 5*h* is a portion that is more easily deformed by heating than a portion of the lid 5 other than the easily deformable portion 5*h*. Since the easily deformable portion 5*h* of the lid 5 is more easily deformed than the portion other than the easily deformable portion 5*h*, the easily deformable portion 5*h* can be intentionally deformed along with the welding, and the deformation of the package 2 can be suppressed.

When viewed from the third direction D3, the welded portion 5*g* has a frame shape, and the easily deformable portion 5*h* is provided inside the welded portion 5*g*. The easily deformable portion 5*h* has, for example, a rectangular shape inside the welded portion 5*g* when viewed from the third direction D3. For example, the lid 5 has a lower surface portion 5*j* positioned on the side of the bottom wall 2*d* and an upper surface portion 5*k* provided from the lower surface portion 5*j* to the side (upper side in FIG. 3) opposite to the bottom wall 2*d*.

The easily deformable portion 5*h* is, for example, a step difference portion located between the lower surface portion 5*j* and the upper surface portion 5*k*. The easily deformable portion 5*h* is a concave step difference portion recessed in the third direction D3 with respect to the welded portion 5*g*. It is noted that the easily deformable portion 5*h* may be the convex step difference portion protruding in the third direction D3 with respect to the welded portion 5*g*. The easily deformable portion 5*h* extends, for example, tiltingly downward toward the center of the lid 5. In the lid 5, after being heated, the welded portion 5*g* is pulled toward the center of the lid 5. At this time, since the upper side of the easily deformable portion 5*h* is deformed so as to move toward the center of the lid 5, the deformation toward the center of the package 2 can be suppressed. That is, since the stress of the first side wall 2*b* and the second side wall 2*c* toward the center of the package 2 is reduced, the deformation of the package 2 can be suppressed.

The lid 5 has an edge side 5*p* facing the direction (first direction D1 or second direction D2) intersecting with the third direction D3. The edge side 5*p* includes a pair of short sides 5*q* extending along the second direction D2 and being aligned in the first direction D1 and a pair of long sides 5*r* extending along the first direction D1 and being aligned in the second direction D2. A distance K1 from the short side 5*q* to the easily deformable portion 5*h* in the first direction D1 is longer than a distance K2 from the long side 5*r* to the easily deformable portion 5*h* in the second direction D2.

Next, the functions and effects obtained from the optical module 1 according to this embodiment will be described in more detail. In the optical module 1, the opening 2*g* of the package 2 is sealed with the lid 5. The lid 5 has the welded portion 5*g* fixed by welding to the upper surface 2*k* of the package 2 in which the opening 2*g* is formed and the easily deformable portion 5*h* deformed as the result of the welding. The easily deformable portion 5*h* is formed at a position separated from the welded portion 5*g*. Therefore, by deforming the easily deformable portion 5*h* separated from the welded portion 5*g* with the package 2 as a result of the welding, the deformation of the package 2 can be suppressed. That is, the deformation of the easily deformable portion 5*h* can reduce the stress applied to the package 2 due to the welding, so that the deformation of the package 2 is suppressed. Therefore, even in the case of this embodiment in which the optical system is completed inside the package 2, it is possible to suppress the deviation in the positions of the optical components due to the deformation of the package 2, so that the light coupling efficiency can be stabilized.

In the embodiment, the lid 5 may have a plate shape, and the easily deformable portion 5*h* may be a step difference portion forming a convex shape or a concave shape in a plate thickness direction (third direction D3) of the lid 5 with respect to the welded portion 5*g*. In this case, since the easily deformable portion 5*h* can be formed as a step difference portion, the easily deformable portion 5*h* can be formed easily.

In the embodiment, the lid 5 may have a rectangular shape having the pair of short sides 5*q* and the pair of long sides 5*r* as the edge sides 5*p*, and the distance K1 from the short side 5*q* to the easily deformable portion 5*h* in the longitudinal direction (first direction D1) of the lid 5 may be longer than the distance K2 from the long side 5*r* to the easily deformable portion 5*h* in the transverse direction (second direction D2) of the lid 5. In the case where the length from the edge side 5*p* to the easily deformable portion 5*h* of the lid 5 is long, the easily deformable portion 5*h* can be more easily deformed than that in the case where the length from the edge side 5*p* to the easily deformable portion 5*h* of the lid 5 is short. Therefore, when the distance K1 from the short side 5*q* to the easily deformable portion 5*h* in the longitudinal direction of the lid 5 is longer than the distance K2 from the long side 5*r* to the easily deformable portion 5*h* in the transverse direction of the lid 5, the deformation in the longitudinal direction (first direction D1) of the package 2 can be more reliably suppressed by allowing the easily deformable portions 5*h* aligned along the longitudinal direction of the lid 5 to be more easily deformed. Therefore, since the deformation in the longitudinal direction of the package 2 can be suppressed more reliably than that in the transverse direction (second direction D2) of the package 2, the light coupling efficiency can be further stabilized.

Figure 4:
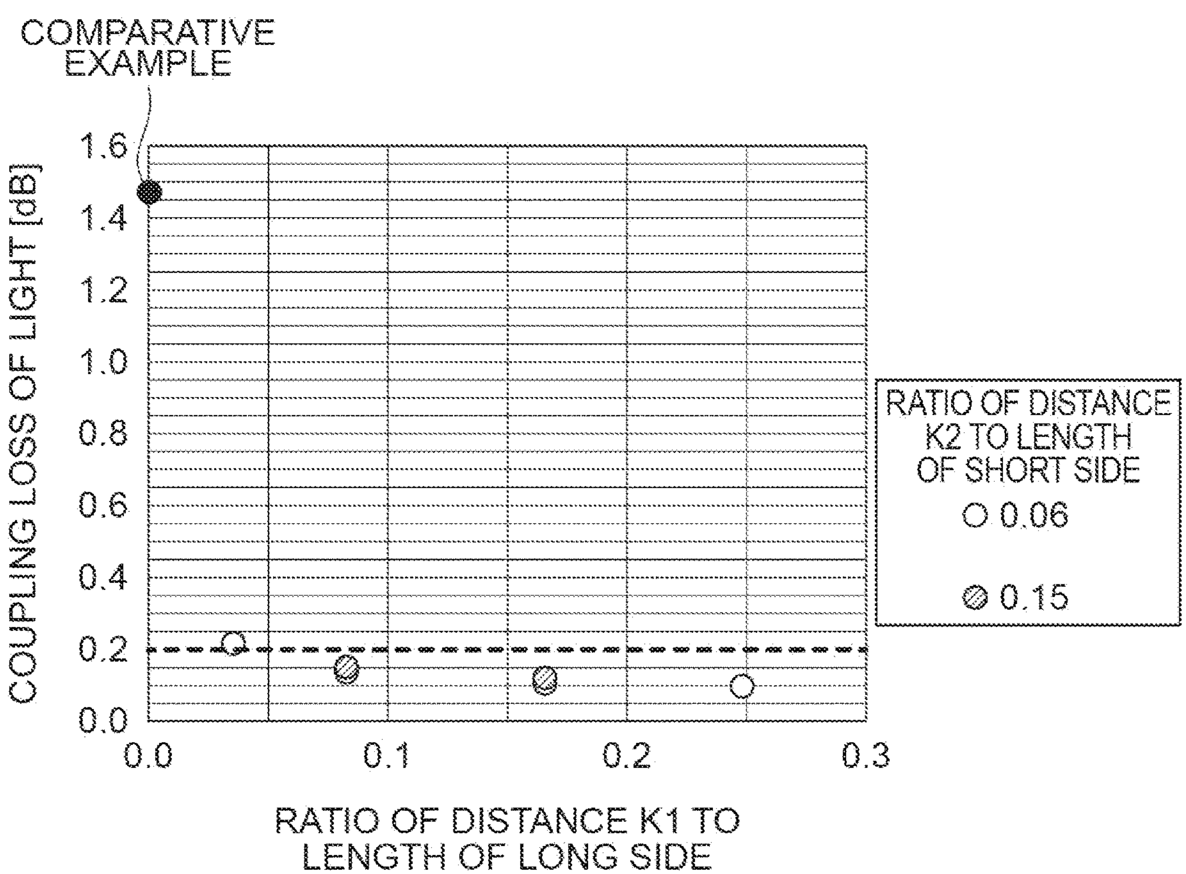
FIG. 4 is a graph illustrating a relationship between a length ratio from an edge side with respect to the length of the edge side of the lid in FIG. 3 to an easily deformable portion and a coupling loss of light.

For example, the distance K1 is 0.05 times or more the length of the long side 5*r* of the lid 5. The distance K2 is 0.15 times or less the length of the short side 5*q* of the lid 5. FIG. 4 is a graph illustrating a relationship between a ratio of a distance K1 with respect to the length of the long side 5*r* of the lid 5 and coupling loss of light. A comparative example of FIG. 4 illustrates the optical module having the lid in which the easily deformable portion 5*h* is not formed. As illustrated in FIG. 4, when the easily deformable portion 5*h* is provided, the coupling loss of light can be reduced more than the comparative example in which the easily deformable portion 5*h* is not included. When the distance K1 is 0.05 times or more the length of the long side 5*r* of the lid 5, the coupling loss of light can be reduced to 0.2 dB or less. When the distance K2 is 0.06 times the length of the short side 5*q* of the lid 5, the light coupling loss can be further reduced in comparison with the case where the distance K2 is 0.15 times the length of the short side 5*q* of the lid 5.

Figure 5:
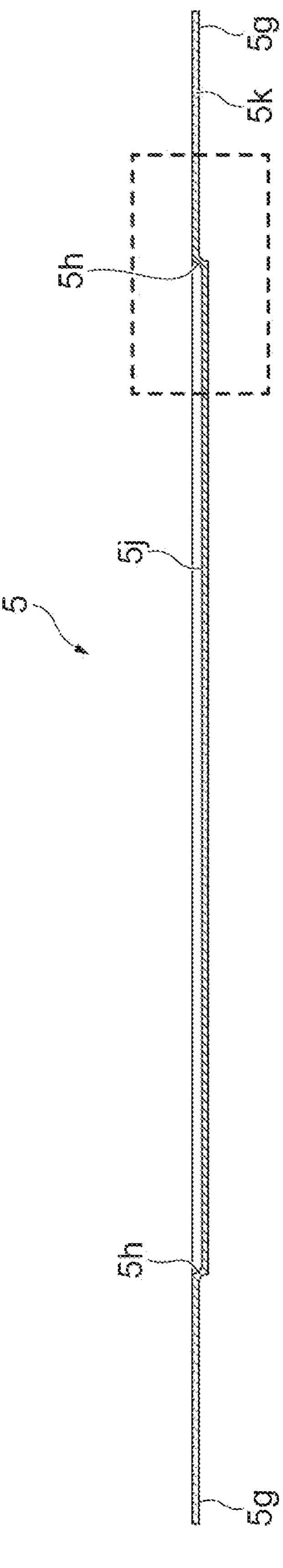
FIG. 5 is a cross-sectional view illustrating the lid of FIG. 1.
Figure 6:
FIG. 6 is an enlarged cross-sectional view of an easily deformable portion of the lid in FIG. 5.
Figure 6:
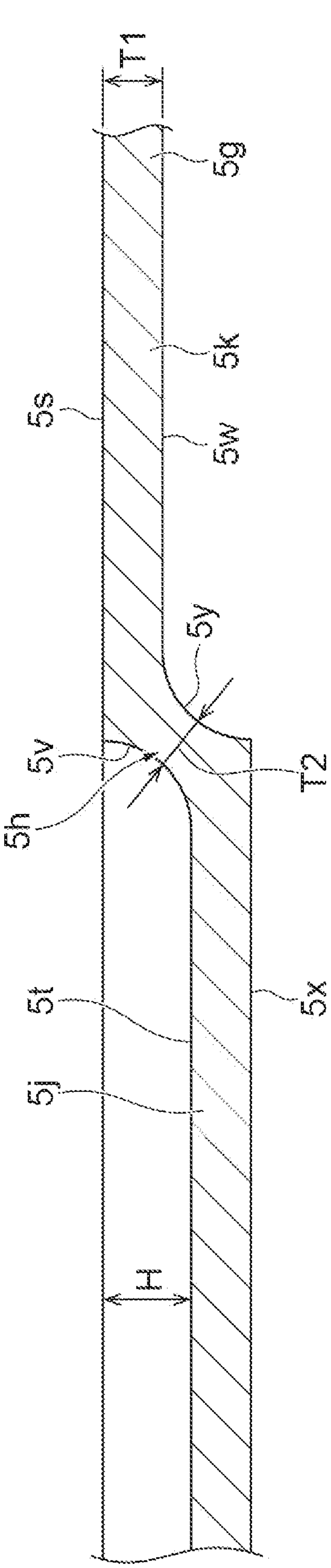

Next, a detailed example of the easily deformable portion 5*h* will be described with reference to FIGS. 5 and 6. FIG. 5 is a cross-sectional view of the lid 5 when the lid 5 is cut along planes extending in the first direction D1 and the third direction D3. FIG. 6 is an enlarged sectional view of the easily deformable portion 5*h* of the lid 5 of FIG. 5. As illustrated in FIGS. 5 and 6, for example, the easily deformable portion 5*h* may be the thin portion that is thinner than the portion of the lid 5 other than the easily deformable portion 5*h*.

For example, a thickness T1 of the portion (welded portion 5*g*) other than the easily deformable portion 5*h* of the lid 5 is 0.15 mm or less, and a minimum thickness T2 of the easily deformable portion 5*h* is 0.1 mm or less. As an example, a depth H (height of the upper surface portion 5*k* with respect to the lower surface portion 5*j*) of the easily deformable portion 5*h* is 0.1 mm or more. The easily deformable portion 5*h* includes, for example, a first curved surface 5*v* in which the lid 5 is recessed and curved from the upper surface 5*s* of the upper surface portion 5*k* to an upper surface 5*t* of the lower surface portion 5*j* and a second curved surface 5*y* in which the lid 5 is recessed and curved from a lower surface 5*w* of the upper surface portion 5*k* to a lower surface 5*x* of the lower surface portion 5*j*. Since the easily deformable portion 5*h* having the first curved surface 5*v* and the second curved surface 5*y* is more deformable than the portions of the lid 5 other than the easily deformable portion 5*h*, by deforming the easily deformable portion 5*h*, it is possible to allow the package 2 to be more difficult to deform.

Figure 7:
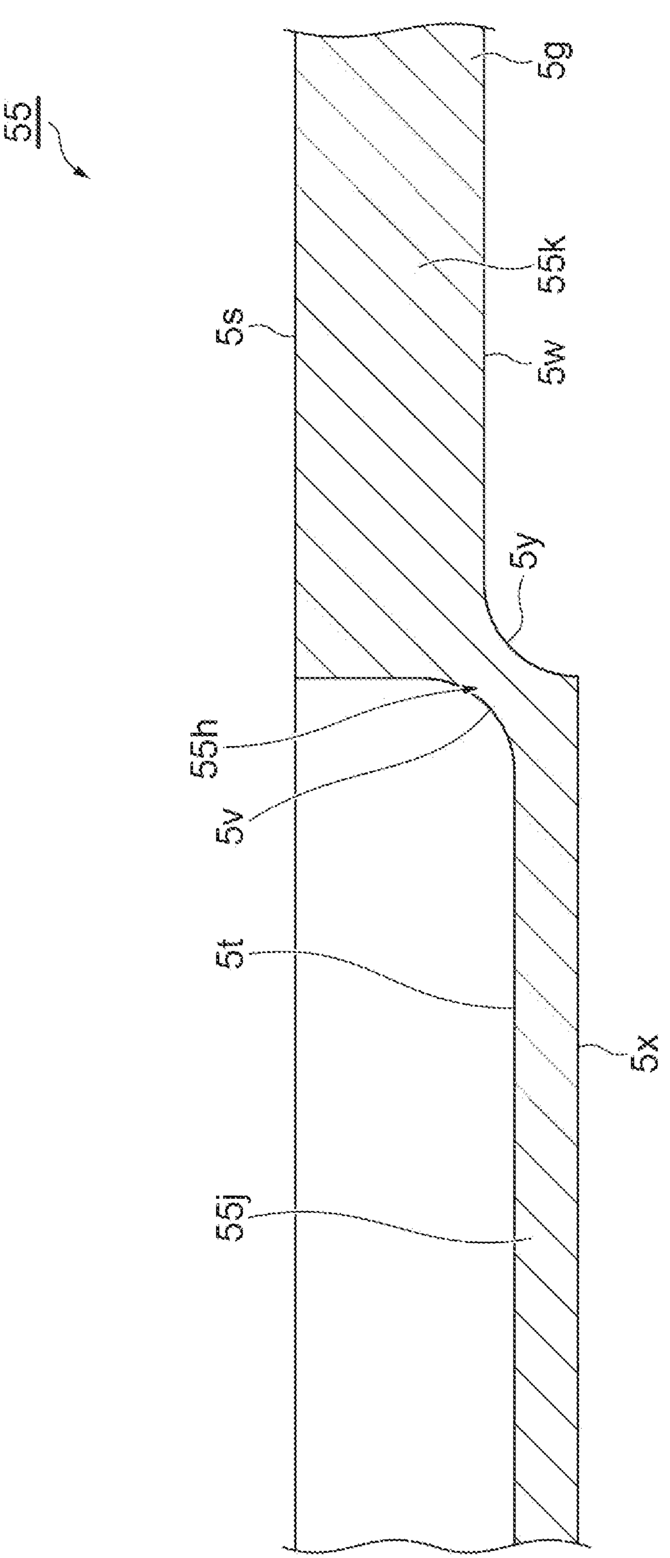
FIG. 7 is an enlarged cross-sectional view of an easily deformable portion according to a modified example different from FIG. 6.

As in the example of FIG. 6, the thickness of the easily deformable portion 5*h* of the lid 5 may be smaller than the thickness T1 of the welded portion 5*g*. In this case, since the easily deformable portion 5*h* can be made easier to deform, the deformation of the package 2 can be suppressed more reliably. FIG. 7 is a cross-sectional view illustrating an easily deformable portion 55*h* of the lid 55 according to a modified example different from that in FIG. 6. As illustrated in FIG. 7, the lid 55 may have an upper surface portion 55*k* and a lower surface portion 55*j* having different thicknesses. In this case, the upper surface portion 55*k* including the welded portion 5*g* of the lid 55 is thicker than the lower surface portion 55*j* not including the welded portion. The lid 55 can also provide the same functions and effects as those of the lid 5.

Figure 8:
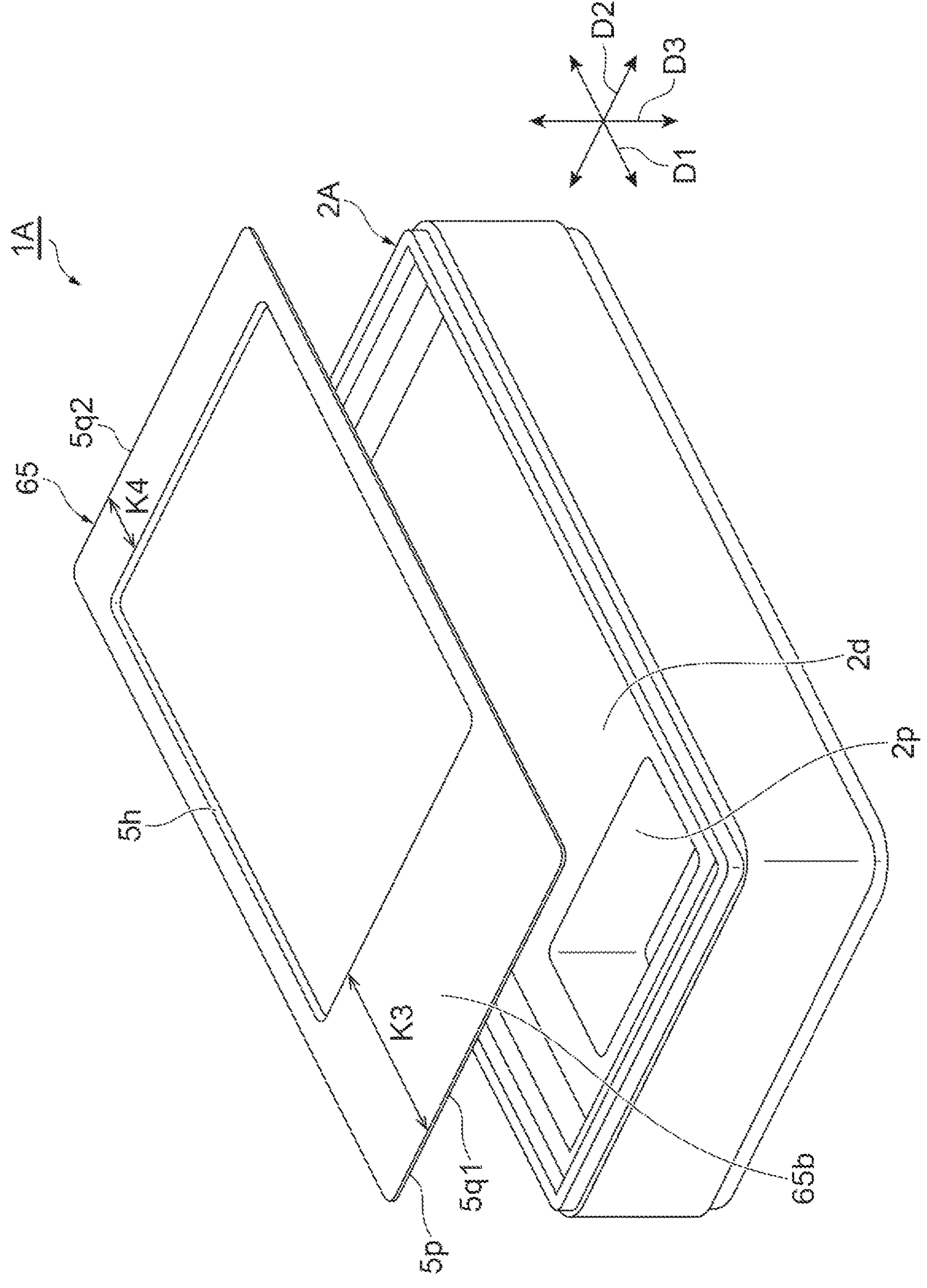
FIG. 8 is a perspective view illustrating a package and a lid of an optical module according to a modified example.

FIG. 8 is a perspective view illustrating an optical module 1A according to a modified example. A portion of the configuration of the optical module 1A is the same as a portion of the configuration of the optical module 1 described above. Therefore, in the following description, components of the description overlapping with the description of the optical module 1 are denoted by the same reference numerals, and the overlapping descriptions will be omitted as appropriate. As illustrated in FIG. 8, the optical module 1A includes a package 2A, and the package 2A has a cavity 2*p* recessed in the third direction D3. For example, the cavity 2*p* is a portion recessed from the bottom wall 2*d* of the package 2 in the third direction D3. The cavity 2*p* is a rectangular space extending in the first direction D1, the second direction D2, and the third direction D3.

The optical module 1A has a lid 65 different from the lid 5. In the lid 65, the position of the easily deformable portion 5*h* is different from that in the lid 5. In the lid 65, a distance K3 from one short side 5*q*1 to the easily deformable portion 5*h* in the first direction D1 is longer than a distance K4 from the other short side 5*q*2 to the easily deformable portion 5*h* in the first direction D1. In the lid 65, the portion 65*b* from one short side 5*q*1 to the easily deformable portion 5*h* faces the cavity 2*p* of the package 2 along the third direction D3. In this manner, the portion 65*b* is provided directly above the portion (in which the cavity 2*p* is formed) of the package 2 having a small volume.

As described above, in the optical module 1A, the package 2A has the cavity 2*p* located below the lid 65. The distance K3 from the edge side 5*p* (one short side 5*q*1) of the portion 65*b* of the lid 65 facing the cavity 2*p* to the easily deformable portion 5*h* is longer than the distance K4 from the edge side 5*p* (the other short side 5*q*2) of the portion of the lid 65 not facing the cavity 2*p* to the easily deformable portion 5*h*. In this case, the easily deformable portion 5*h* in the portion 65*b* of the lid 65 facing the cavity 2*p* can be allowed to be easier to deform than the easily deformable portion 5*h* in the portion of the lid 65 not facing the cavity 2*p*. Therefore, it is possible to allow the peripheral portion of the cavity 2*p* of the package 2A to be more difficult to deform.

Figure 9:
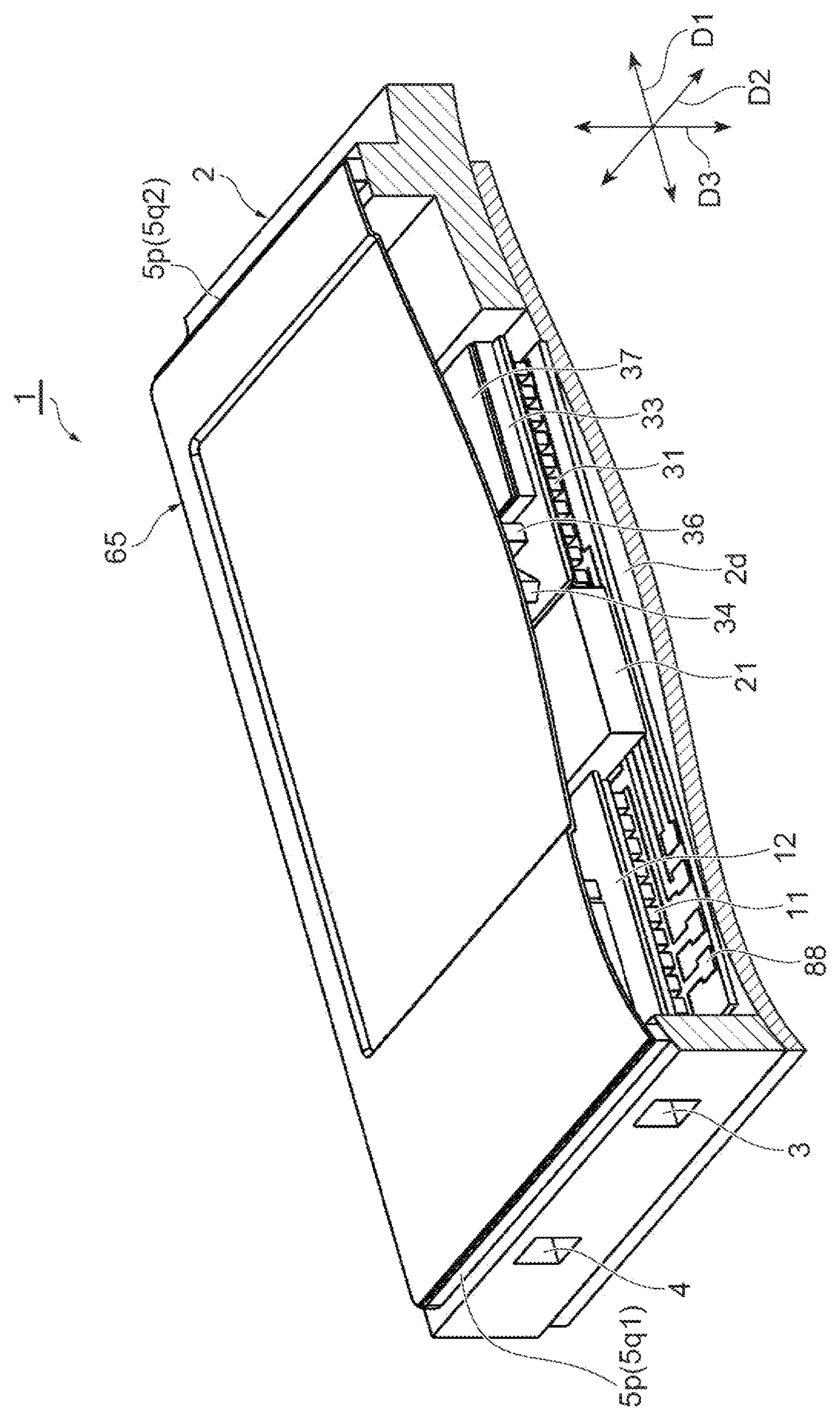
FIG. 9 is a partial cross-sectional view of the optical module according to a modified example different from FIG. 8.
Figure 10:
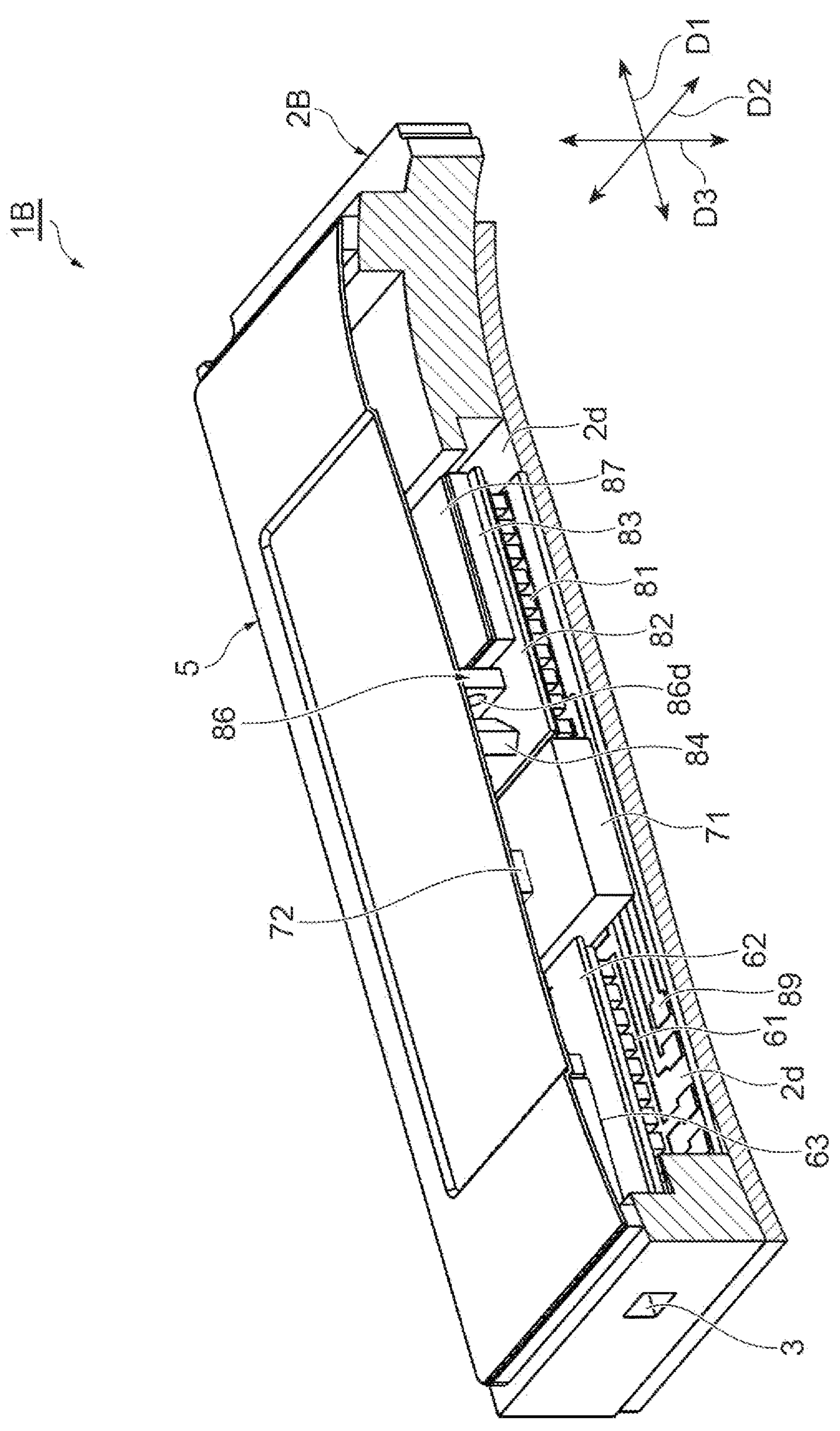
FIG. 10 is a partial cross-sectional view of an optical module according to a modified example different from FIGS. 8 and 9.
Figure 11:
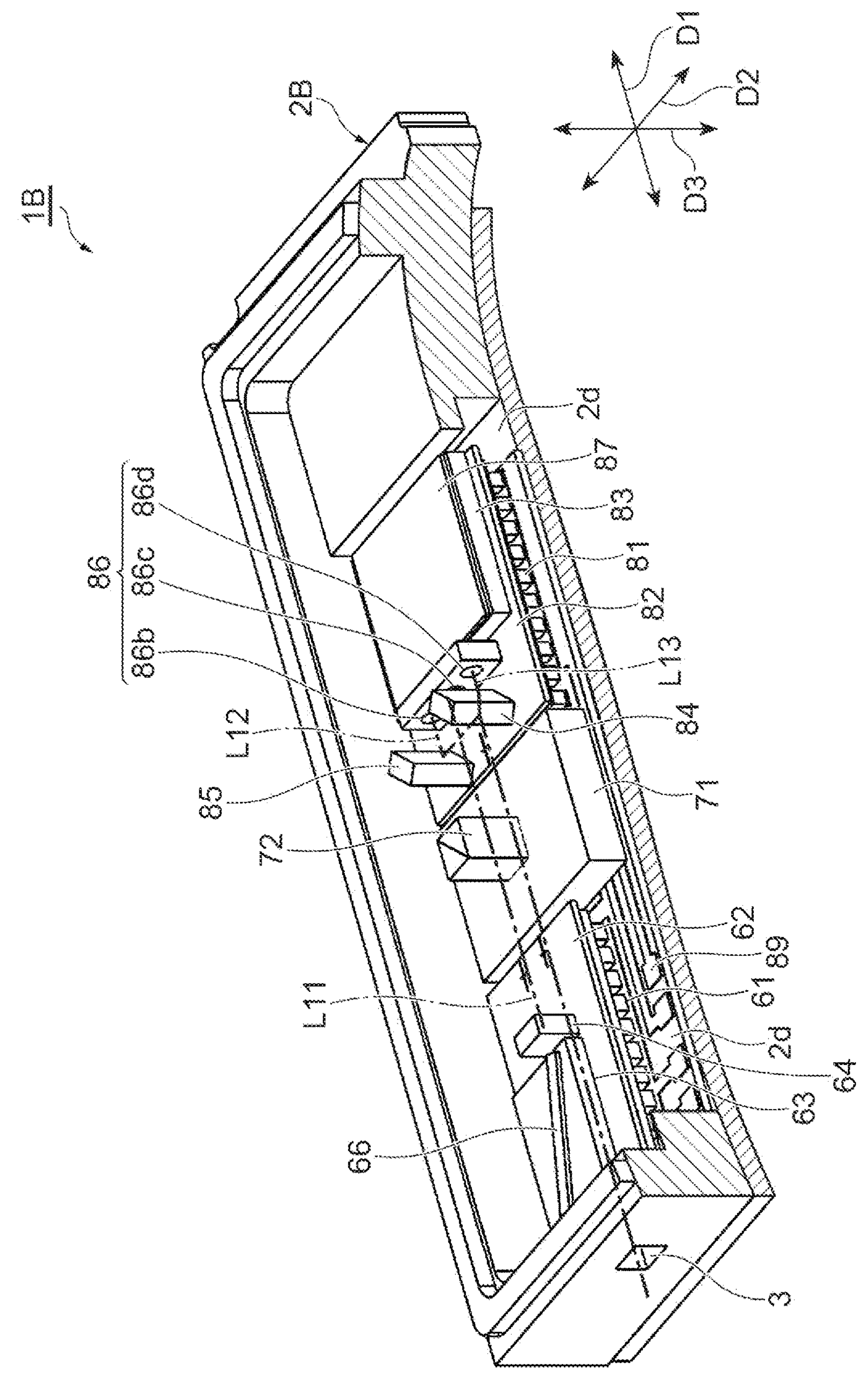
FIG. 11 is a partial cross-sectional view illustrating a state in which the lid is removed from the optical module of FIG. 10.

The lid 65 in which the positions of the easily deformable portions 5*h* in the first direction D1 are asymmetrical can also be applied to the package 2 according to the above-described embodiment, as illustrated in FIG. 9. FIG. 10 is a partial cross-sectional view illustrating an optical module 1B according to a further modified example. FIG. 11 is a partial cross-sectional view illustrating the internal structure of the optical module 1B. For example, the optical module 1B has the lid 5 described above.

The optical module 1B has a package 2B, and only the transmitting-side window 3 is formed in the package 2B. That is, the optical module 1B is an optical transmission module only transmitting optical signals. The optical module 1B includes a first temperature control device 61 mounted on the bottom wall 2*d* of the package 2B, a variable wavelength light source base 62 mounted on the first temperature control device 61, a variable wavelength carrier 63 and a lens 64 mounted on the variable wavelength light source base 62, and the variable wavelength light source element 66 mounted on the variable wavelength carrier 63. Light L11 output from the variable wavelength light source element 66 passes through the lens 64. The light L11 passing through the lens 64 is output from the lens 64 to the side opposite to the transmitting-side window 3.

The optical module 1B includes an intermediate substrate 71 mounted on a lower substrate 89 common to a first temperature control device 61 and a second temperature control device 81 and a beam splitter 72 mounted on the intermediate substrate 71. The beam splitter 72 transmits the light L11 from the lens 64 in the first direction D1. The optical module 1B includes a second temperature control device 81 mounted on the bottom wall 2*d* and a modulation element base 82 mounted on the second temperature control device 81. The optical module 1B further includes a modulation element carrier 83, a polarization multiplexing filter 84, a mirror 85, and a lens 86 mounted on the modulation element base 82, and a modulation element 87 mounted on the modulation element carrier 83.

The lens 86 has a first lens portion 86*b*, a second lens portion 86*c*, and a third lens portion 86*d*, and the first lens portion 86*b*, the second lens portion 86*c*, and the third lens portion 86*d* are aligned in this order along the second direction D2. The second lens portion 86*c* transmits the light L11 emitted from the beam splitter 72 and outputs the transmitted light to the modulation element 87. The modulation element 87 outputs first output light L12 and second output light L13. The first output light L12 passes through the first lens portion 86*b* and is reflected by the mirror 85 in the second direction D2. The second output light L13 passes through the third lens portion 86*d* to reach the polarization multiplexing filter 84. The polarization multiplexing filter 84 reflects the first output light L12 reflected in the second direction D2 by the mirror 85 in the first direction D1 and outputs the first output light L12 to the transmitting-side window 3 and transmits the second output light L13 to be output to the transmitting-side window 3.

The optical module 1B includes the package 2B on which each optical component described above is mounted and the lid 5 sealing the package 2B. Therefore, the same functions and effects as the optical module 1 can be obtained from the optical module 1B. It is noted that the optical module 1B may have the lid 65 instead of the lid 5.

The embodiments and various modifications of the optical module according to the present disclosure have been described above. However, the invention is not limited to the embodiments or various modifications described above. That is, it is easily recognized by those skilled in the art that the present invention can be modified and changed in various ways without changing the spirit of the claims. For example, the shape, size, number, material, and layout of each component of the optical module are not limited to those described above and can be changed as appropriate.

What is claimed is:

1. An optical module comprising:

a package having an opening surrounded by side walls; and a lid mounted on the package to seal the opening, wherein the lid has a plate-like shape and includes a welded portion fixed by welding to an upper surface of the side wall of the package having the opening formed thereon, an easily deformable portion formed at a position separated from the welded portion and deformed along with the welding, and a central portion having a flat shape, wherein the lid has a rectangular shape having a pair of short sides and a pair of long sides as edge sides, and wherein a distance from the short side to the easily deformable portion in a longitudinal direction of the lid is longer than a distance from the long side to the easily deformable portion in a transverse direction of the lid.

2. The optical module according to claim 1, wherein the easily deformable portion is a step difference portion forming a convex shape or a concave shape in a plate thickness direction of the lid with respect to the welded portion.

3. The optical module according to claim 1, wherein a thickness of the easily deformable portion of the lid is smaller than a thickness of the welded portion.

4. The optical module according to claim 1, wherein the lid has an edge side, wherein the package has a cavity located below the lid, and wherein a distance from the edge side to the easily deformable portion of the lid in a portion facing the cavity is longer than a distance from the edge side of the lid in a portion not facing the cavity to the easily deformable portion.

5. The optical module according to claim 1, wherein a convex frame is provided on the upper surface of the side wall of the package.

6. An optical module comprising:

a package having an opening surrounded by side walls; and a lid mounted on the package to seal the opening, wherein the lid has a plate-like shape and includes a welded portion fixed by welding to an upper surface of the side wall of the package having the opening formed thereon, an easily deformable portion formed at a position separated from the welded portion and deformed along with the welding, and a central portion having a flat shape, wherein the lid has an edge side, wherein the package has a cavity located below the lid, and wherein a distance from the edge side to the easily deformable portion of the lid in a portion facing the cavity is longer than a distance from the edge side of the lid in a portion not facing the cavity to the easily deformable portion.

7. The optical module according to claim 6, wherein the easily deformable portion is a step difference portion forming a convex shape or a concave shape in a plate thickness direction of the lid with respect to the welded portion.

8. The optical module according to claim 6, wherein a thickness of the easily deformable portion of the lid is smaller than a thickness of the welded portion.

9. The optical module according to claim 6, wherein the lid has a rectangular shape having a pair of short sides and a pair of long sides as edge sides, and wherein a distance from the short side to the easily deformable portion in a longitudinal direction of the lid is longer than a distance from the long side to the easily deformable portion in a transverse direction of the lid.

10. The optical module according to claim 6, wherein a convex frame is provided on the upper surface of the side wall of the package.

* * * * *